US010152855B1

(12) United States Patent
Smith et al.

(10) Patent No.: US 10,152,855 B1
(45) Date of Patent: Dec. 11, 2018

(54) WIRELESS TAMPER SYSTEM

(71) Applicant: THE BOEING COMPANY, Chicago, IL (US)

(72) Inventors: Hollice C. Smith, Seattle, WA (US); Bruce R. Olsen, Snohomish, WA (US); Wade T. Price, Redmond, WA (US); Raymond Roeder, Everett, WA (US); Minas H. Tanelian, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/611,719

(22) Filed: Jun. 1, 2017

(51) Int. Cl.
*G08B 13/14* (2006.01)
*B65D 55/02* (2006.01)
*B64D 11/00* (2006.01)

(52) U.S. Cl.
CPC ....... *G08B 13/1445* (2013.01); *B65D 55/028* (2013.01); *B64D 11/003* (2013.01)

(58) Field of Classification Search
CPC .... B65D 55/022; B65D 55/028; B65D 55/06; G09F 3/04
See application file for complete search history.

(56) References Cited

U.S. PATENT DOCUMENTS

| 5,887,176 | A | * | 3/1999 | Griffith | G06K 7/10019 340/10.33 |
|---|---|---|---|---|---|
| 2009/0140857 | A1 | * | 6/2009 | Krill | G08B 13/1436 340/545.1 |
| 2009/0309722 | A1 | * | 12/2009 | Nichols | G06Q 10/08 340/541 |
| 2010/0171592 | A1 | * | 7/2010 | Kamemaru | H04L 1/0045 340/10.1 |
| 2011/0074582 | A1 | * | 3/2011 | Alexis | G08B 13/149 340/572.1 |
| 2011/0254665 | A1 | * | 10/2011 | Lindsay | G06K 19/0717 340/10.5 |
| 2012/0203498 | A1 | * | 8/2012 | Fleischman | G06F 21/86 702/150 |
| 2016/0275769 | A1 | * | 9/2016 | McIntosh | G08B 13/2414 |
| 2017/0004335 | A1 | * | 1/2017 | Russell | G06Q 10/00 |

* cited by examiner

*Primary Examiner* — Laura Nguyen
(74) *Attorney, Agent, or Firm* — Toler Law Group, P.C.

(57) ABSTRACT

Disclosed is a wireless tamper sensor ("WTS"). The WTS includes a transmitter, probe, processing device, and power supply. The processing device is in signal communication with the probe and the power supply is in signal communication with the transmitter and processing device. The processing device includes a processor and a computer-readable medium ("CRM"). The CRM has encoded thereon computer-executable instructions to cause the processor to initiating a tamper state to untampered, detect a physical trigger on the probe, and set the tamper state to tampered in response to detecting the physical trigger.

19 Claims, 10 Drawing Sheets

WIRELESS TAMPER SYSTEM

BACKGROUND

1. Field

The present disclosure is related to sensors, and in particular, to sensors that detect tampering.

2. Related Art

In commercial travel there is a need to screen and secure items placed within storage areas of many commercial vehicles such as, for example, aircraft, buses, ships, trains, or trucks. Additionally, within commercial aircraft, buses, trains, and ships, there may be cabins, closets, pallets, and rooms that need to be kept closed and secure, such as maintenance areas.

In many of these situations, physically locking a specific area may not be an option. For example, the bins above passengers, washrooms, and galleys in a commercial airliner train or bus may need to be easily accessible at one point or another while traveling. As another example, the washrooms in a vehicle may need to be inspected, secured, and closed prior to passengers boarding the vehicle for security purposes. Similarly, in an aircraft, crew related items may need to be stored in an overhead bin or closet that also needs to be closed and secured. Moreover, storage compartments in a galley may also need to be inspected, closed, and secured.

At present, the approach to securing these areas is generally limited to inspecting, closing, and placing a device at the access of the area that may be a door or flap. Examples of the device may include multiple devices or items that provide visual evidence of tamper, such as, for example, a zip tie, an adhesive seal or tape, and a plastic padlock that are permanently altered or broken by a tamper event. For example, in FIG. 1, a system block diagram of an example of an implementation of a known security seal 100 is shown attached to an overhead bin door 102 of an overhead bin 104. The overhead bin 104 may be located within an aircraft, bus, train, or other passenger vehicle. The security seal 100 is located on both the overhead bin body 106 and the overhead bin door 102 in a straddling fashion that bridges the gap 108 between the overhead bin body 106 and the overhead bin door 102.

Figure 2:
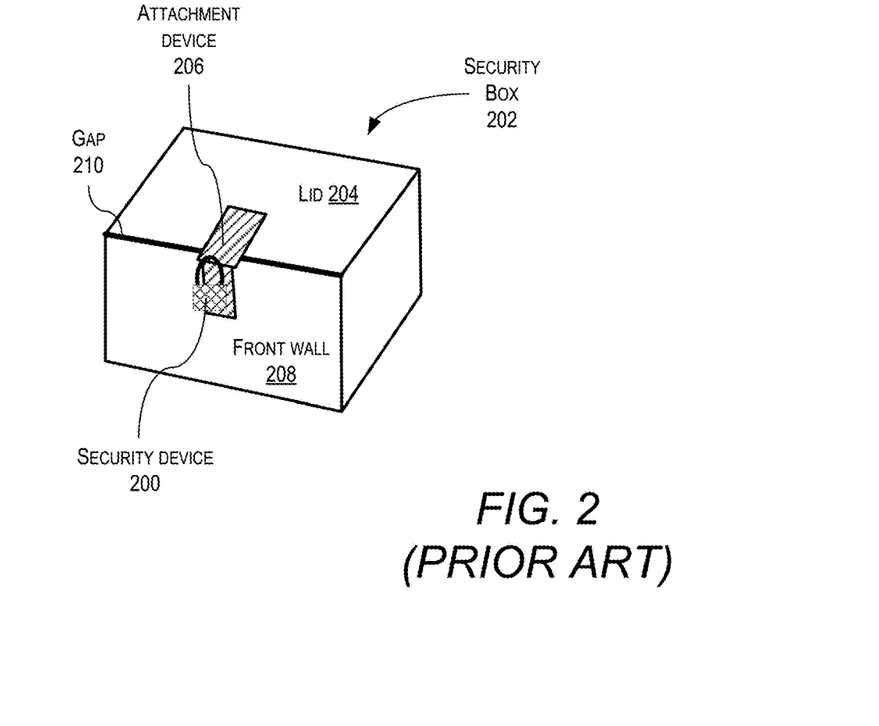
FIG. 2 is a system block diagram of an example of another implementation of a known security device attached to a security box.

Turning to FIG. 2, a system block diagram of an example of another implementation of a known security device 200 is shown attached to a secure box 202. Again, the secure box 202 may be located within an aircraft, bus, train, or other passenger vehicle. The security device 200 may be a padlock type device, zip tie, adhesive seal or tap, or other similar device. The security box 202 may be a storage location having a lid 204 that is utilized to store secure items that include, for example, crew items and/or emergency equipment, life vest(s), fire extinguisher, automated external defibrillator ("AED"), etc. In this example, the security device 200 may be a padlock type device that attaches to an attachment device 206 that is located on both the lid 204 and a front wall 208 of the security box 202 in a straddling fashion that bridges a gap 210 between the front wall 208 and the lid 204.

Figure 1:
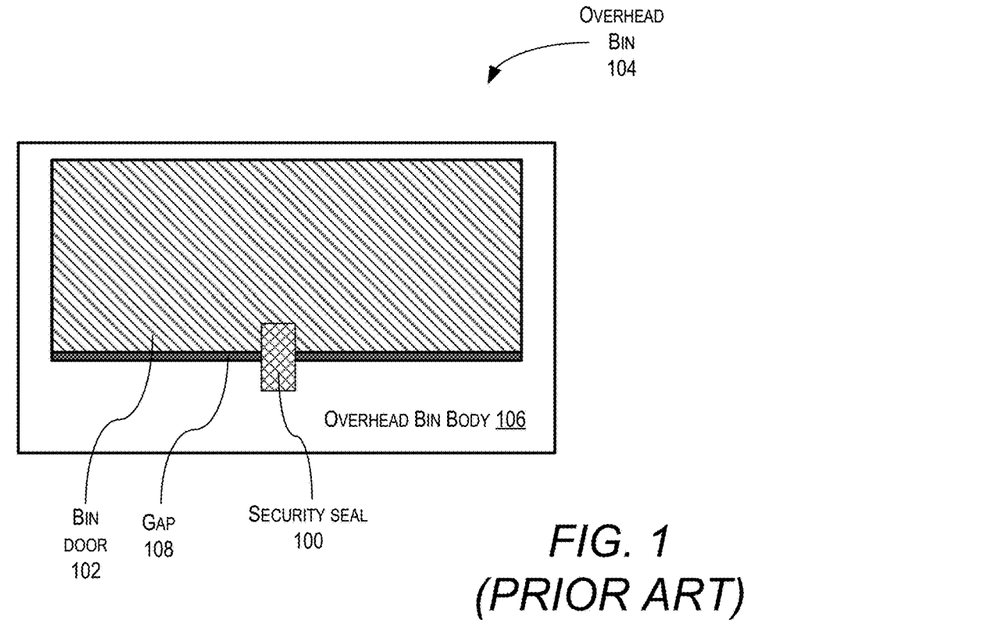
FIG. 1 is a system block diagram of an example of an implementation of a known security seal attached to an overhead bin door of an overhead bin.

In both examples, if either the overhead bin door 102 or security box 202 lid 204 is opened, the corresponding security seal 100 or security device 200 will be physically and visibly damaged indicating that someone opened (or attempted to open) either the overhead bin door 102 or lid 204. Generally, the security seals (such as security seal 100 or security device 200) are a type of tape or device that are usually known as, for example, tamper seals, security seals, tamper evident security seals, security tapes, tamper evident tapes, plastic zip ties, or padlocks, which for the purpose of simplicity are herein referred to as "security seals" or "security devices." In general, these security seals or devices are designed to be visually inspected and easily recognized if tampered with or broken. As an example, security seals or devices are utilized in commercial aircraft to help ensure that any items placed onto the aircraft have been cleared by the relevant security personnel, and once cleared, those items are sealed to make sure that they cannot be tampered with before, during and post flight.

Unfortunately, while useful, these types of security seals or devices require the relevant security personal or crew member to walk through the vehicle and visually, and possibly physically, inspect each security seal or device individually to see if it has been tampered. As a result, this leads to downtime of the vehicle and increased manual labor costs related to the physical inspection of all of the security seals or devices on the vehicle. Therefore, there is a need for a system and method that addresses the limitations of the known security seals and devices.

SUMMARY

A wireless tamper sensor ("WTS") is disclosed. The WTS includes a transmitter, probe, processing device, and power supply. The processing device is in signal communication with the probe and the power supply is in signal communication with the transmitter and processing device. The processing device includes a processor and a computer-readable medium ("CRM"). The CRM has encoded thereon computer-executable instructions to cause the processor to initiating a tamper state to untampered, detect a physical trigger on the probe, and set the tamper state to tampered in response to detecting the physical trigger.

In an example of operation, the WTS preforms a method that includes initiating a tamper state to untampered, detecting a physical trigger, and setting the tamper state to tampered in response to detecting the physical trigger.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Disclosed is a wireless tamper sensor ("WTS"). The WTS includes a transmitter, probe, processing device, and power supply. The processing device is in signal communication with the probe and the power supply is in signal communication with the transmitter and processing device. The processing device includes a processor and a computer-readable medium ("CRM"). The CRM has encoded thereon computer-executable instructions to cause the processor to initiate a tamper state to untampered, detect a physical trigger on the probe, and set the tamper state to tampered in response to detecting the physical trigger. As such, in an example of operation, the WTS preforms a method that includes initiating a tamper state to untampered, detecting a physical trigger, and setting the tamper state to tampered in response to detecting the physical trigger.

Figure 3:
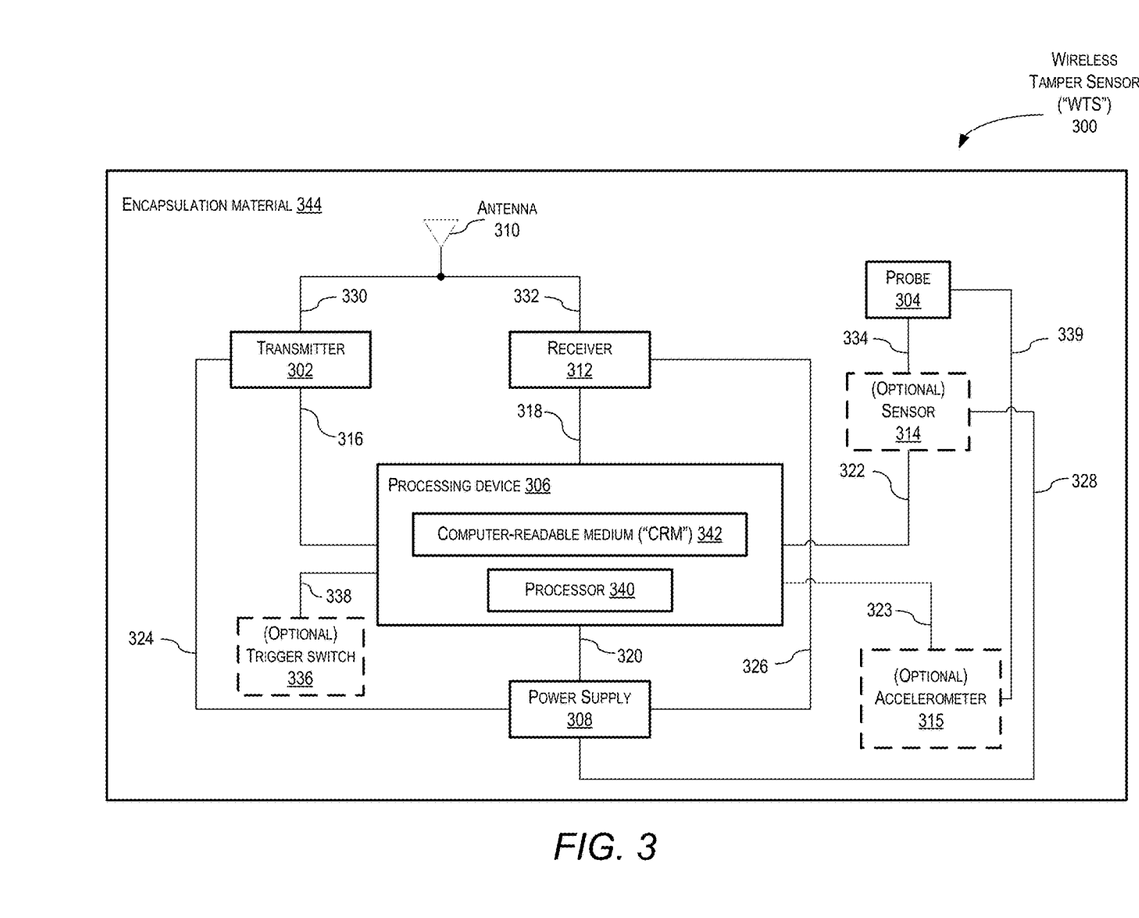
FIG. 3 is a system block diagram of an example of an implementation of a wireless tamper sensor ("WTS") in accordance with the present disclosure.

In FIG. 3, a system block diagram is shown of an example of an implementation of the WTS 300 in accordance with the present disclosure. The WTS 300 includes a transmitter 302, probe 304, processing device 306, and a power supply 308. The WTS 300 may also include an antenna 310, receiver 312, sensor 314, and optional accelerometer 315 (or other solid-state electronic sensor capable of measuring movement and/or vibration). In this example, the processing device 306 is in signal communication with the transmitter 302, receiver 312, power supply 308, sensor 314, and the optional accelerometer 315 via signal paths 316, 318, 320, 322, and 323, respectively. The power supply 308 is in signal communication with the transmitter 302, receiver 312, and the sensor 314 via signal paths 324, 326, and 328, respectively. The antenna 310 is in signal communication with the transmitter 302 and receiver 312 via signal paths 330 and 332, respectively. Moreover, the probe 304 is in signal communication with the sensor 314 via signal path 334 and the processing device 306 via the sensor 314 and signal paths 334 and 322. In this example, the WTS 300 may optionally also include an optional trigger switch 336 in signal communication with the processing device 306 via signal path 338. The optional accelerometer 315 may be in signal communication with the probe 304 via signal path 339.

In this example, the processing device 306 may include a processor 340 and a computer-readable medium ("CRM") 342. In general, the CRM 342 has encoded thereon computer-executable instructions to cause the processor 340 to perform different functions in the operation of the WTS 300. The processor 340 may be any microprocessor or similar device, such as, for example, a central processing unit ("CPU"), digital signal processing ("DSP") device, application specific integrated circuit ("ASIC"), or a field programmable-gate array ("FPGA"). In general, the CRM 342 may be software or firmware and the computer-executable instructions stored on the CRM 342 may include, for example, an operating system, software, and other modules, programs, or applications that are loadable and executable by processor 340. Moreover, in the example of the CRM 342 being firmware, the computer-executable instructions may include hardware logic (i.e., machine instructions) that controls the operation of the processor 340. In this example, the CRM 342 may be in signal communication with the processor 340 via a signal path that includes a bus.

The power supply 308 may be a battery configured to power the WTS 300 for an extended period of time. It is appreciated by those of ordinary skill in the art that the transmitter 302 and receiver 312 may be independent devices or combined together to form part of a transceiver. The probe 304 may be any type of device capable of detecting a physical force (i.e., a physical trigger) associated with a tampering activity where the physical trigger may include physically damaging or breaking the probe. Examples of the probe 304 include a wire, electrical substrate, or other electrically conductive material. Also as another example, the antenna 310 may be probe 304. In other words, the antenna 310 and probe 304 may be the same element (i.e., device, component, module, or circuit) where the antenna 310 may have an antenna length that is approximately equal to a fractional length (such as, for example, a half-wavelength) of an operating frequency of operation of the transmitter 302 and receiver 312. In this example, the physical trigger may be a damaging or breaking of the antenna 310 that results in the reduction of the antenna length. It is appreciated by those of ordinary skill in the art that changing the antenna length of the antenna 310 will alter the electrical properties of the antenna 310 that include, for example, causing the antenna 310 to operate at a new shifted frequency (i.e., it will result in a new operating frequency that is equal to the new reduced antenna length of the antenna 310 after the breakage or damage of the antenna 310 by the tampering activity), be less efficient at receiving and transmitting signals at the original frequency of operation of the transmitter 302 and receiver 312 (i.e., the quality of reception and transmission will be degraded), and changing the input impedance of the antenna 310.

In some implementations the WTS 300 may not have a sensor 314 and the probe 304 will be in direct signal communication (i.e., directly connected) to the processing device 306, where the processing device 306 will include a module or logic capable of sensing the physical trigger associated with the tampering activity. As described earlier, the WTS 300 may optionally include the sensor 314 or not because the probe 304 may be in direct signal communication with processing device 306. However, if present, the sensor 314 may be a device, component, module, or circuit configured to sense the physical trigger on the probe 304. If the optional trigger switch 336 is included in the WTS 300, the optional trigger switch 336 may be a user activated switch that arms the WTS 300 to detect the physical trigger on the probe 304 by initiating a tamper state of the WTS 300 to "untampered."

In addition to, or instead of, the sensor 314, the WTS may also optionally include the optional accelerometer 315. An accelerometer is a device that measures the proper acceleration of the device, which is a rate of change of velocity of the device in its own instantaneous rest frame (i.e., measures movements or vibrations of the device). If present in the WTS 300, the optional accelerometer 315 detects any movement or vibration (which is a very small movement that is a oscillating, reciprocating, or other periodic type of motion) as the physical trigger.

In this example, the entire WTS 300 may be enclosed by an encapsulation material 344 that may include, for example, paper, cloth, elastomer, nitrile, fluorosilicone, fluoroelastomer, neoprene, silicone, ethylene propylene diene monomer ("EPDM") rubber, fabric, polymeric material, ceramic, thin metal, or other material. In general, the encapsulation material 344 may be referred to as a sensor external substrate.

It is appreciated by those skilled in the art that the circuits, components, modules, and/or devices of, or associated with, the WTS 300 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

In general, as an example of operation, the computer-executable instructions of the CRM 342 will cause the processor 340 to initiate a tamper state to untampered, detect a physical trigger on the probe 304, and set the tamper state to tampered in response to detecting the physical trigger. In this example, the computer-executable instructions of the CRM 342 may initiate the tamper state to untampered either by a user arming the WTS 300 via the optional trigger switch 336 or by receiving a "wake" command from an external device in signal communication with the WTS 300. The external device may be a server, user portable device, or other wireless device capable of interfacing with the WTS 300. In this example, the term "arming" or "armed" is utilized to designate that the WTS 300 is placed in a state that detects any tampering on the WTS 300 by either moving or damaging the WTS 300.

If the WTS 300 is armed by an external device, the computer-executable instructions of the CRM 342 will cause the processor 340 to receive the wake command from the external device and then authenticate the wake command. It is appreciated by those of ordinary skill in the art that the wake command may be authenticated by a process that includes determining that the external device is an "authenticated interrogator" by utilizing a series of predetermined security protocols. Once the wake command is authenticated, the computer-executable instructions of the CRM 342 then causes the processor 340 to initiate the tamper state to untampered. In this example, it is assumed that the tamper state of the WTS 300 is in a state that is not "untampered" but may not be in a state that is "tampered;" however, it is also appreciated that the state of the WTS 300 may vary based on the design of the WTS 300.

In another example, it is appreciated by those of ordinary skill in the art that setting the state to untampered may involve more than only receiving the wake command. The wake command may include instructions to set the tamper state to untampered, or, other instructions. Specifically, receiving the wake command may be for initial setup only where the WTS 300 may initially be running in a lower power scheme where the WTS 300 is in a dormant state for several seconds, powers up the processor device 306 for a short time (for example, a few milli-seconds) to listen to the receiver 312 for an authenticated command signal that may be an independent signal from the initial wake command. In this example, the wake command may only cause the processing device 306 to query the receiver 312 for a wake package of information for what operation is being requested, which may include to set the state to untampered, or to query the WTS 300 state and then send a report, or possibly other encoded functionality at the processing device 306. In the case of authenticated command signal, once authenticated the processing device 306 may further execute instructions that may set the initial state of the WTS 300 to untampered, to read the sensor current state, read the power level remaining, generate a report, instruct to transmit, or other instructions. In another example, the wake command may also act as a "reset" function to place the WTS 300 into the untampered state.

For example, the WTS 300 may include an "off" state prior to being deployed and initiating the tamper state to untampered may include changing the off state to the untampered state by arming the WTS 300 either with the optional trigger switch 336 or the wake command from the external device. Alternatively, the WTS 300 may only include two states (i.e., untampered and tampered) and initiating the tamper state to untampered may include powering up the components of the WTS 300 once the wake command is received and authenticated or the user arms the WTS 300 via the optional trigger switch 336. In either example, the WTS 300 is armed by a user directly (via the optional trigger switch 336) or a user wirelessly (via a wireless connection with the external device).

In yet another example, the WTS 300 may be a resettable device capable of being reutilized after first use. In this example, the WTS 300 may have been first utilized in a situation that detected that the WTS 300 was tampered with by a physical trigger. As an example, the WTS 300 includes the optional accelerometer 315 and the WTS 300 is utilized to monitor tampering of a door where the WTS 300 is placed on the door and armed. The door is subsequently moved causing the computer-executable instructions to cause the processor 340 to first detect the physical trigger (i.e., the movement of the door) on the probe 304, which may be in signal communication with the optional accelerometer 315, and then set the tamper state to tampered in response to detecting the physical trigger. However, since in this example the physical trigger is the movement of the door and the movement has not caused any damage to the WTS 300, the WTS 300 may be reset and utilized again either on the same door or in another application that needs to detect movement. In this example, the WTS 300 may not include the sensor 314 (because the sensor for movement is the optional accelerometer 315) nor a separate probe 304 that is independent from the optional accelerometer 315 because the probe 304 may be part of the optional accelerometer 315 or an extension of it such as, for example, a mechanical filter (i.e., a vibration filter). In this example, once the WTS 300 is ready for reuse, the WTS 300 may receive a reset signal from the external device or the user may again activate the optional trigger switch 336 that causes the computer-executable instructions to cause the processor 340 to reset the state of the WTS 300 back to untampered and the WTS 300 may again monitor the door for another physical trigger.

In operation, once the WTS 300 has been triggered, the WTS 300 may, for example, transmit a tamper state signal in response to detecting the physical trigger, wait to receive a status command from the external device, or do nothing. In the first example, once tampered (i.e., a physical trigger was detected on the probe 304 or the optional accelerometer 315) the computer-executable instructions cause the processor 340 to set the tamper state to tampered in response to detecting the physical trigger. The computer-executable instructions then cause the processor 340 to transmit a tamper state signal in response to detecting the physical trigger, where the tamper state signal indicates that the tamper state is tampered. In this example, the transmitter 302 may transmit the tamper state signal as a beacon or other repetitive transmission to the external device. In this example, the antenna 310 may be a distinct element from the probe 304 and the probe 304 may have been broken or damaged. Alternatively, the optional accelerometer 315 may be a combination of the sensor 314 and probe 304 and the transmitter 302 transmits the tamper state signal via the antenna 310. In another alternative, the probe 304 is the antenna 310 and the transmitter 302 transmits the tamper state signal via the antenna 310 that has been damaged or broken, which reduced the antenna length of the antenna 310. As a result, the antenna 310 receives the tamper state signal from the transmitter 302 and transmits it at an altered frequency (as compared to the original operation frequency of the transmitter 302) because of the reduction of antenna length caused by the physically trigger. In all of these situations, the WTS 300 transmits the tamper state signal automatically after detecting the physical trigger.

In the second example, the WTS 300 does not automatically transmit the tamper state signal when a physical trigger is detected. Instead, the WTS 300 waits to be queried by the external device as to its tamper status. When the WTS 300 receives a status command from the external device, the computer-executable instructions cause the processor 340 to receive the status command from the external device and transmit the tamper state signal in response to receiving the status command. Similar to the first example, in this example, the antenna 310 may be a distinct element from the probe 304 and the probe 304 may have been broken or damaged. Alternatively, the optional accelerometer 315 may be a combination of the sensor 314 and probe 304 and the transmitter 302 transmits the tamper state signal via the antenna 310. In another alternative, the probe 304 is the antenna 310 and the transmitter 302 transmits the tamper state signal via the antenna 310 that has been damaged or broken reducing the antenna length of the antenna 310. As a result, the antenna 310 receives the tamper state signal from the transmitter 302 and transmits it at a shifted frequency because of the reduction of antenna length caused by the physically trigger. In all of these situations, the WTS 300 transmits the tamper state signal only after detecting the physical trigger and receiving the status command from the external device.

In the third example, the WTS 300 does nothing if a physical trigger is detected. In this example, once tampered the computer-executable instructions may cause the processor 340 to set the tamper state to tampered in response to detecting the physical trigger or do nothing. Specifically, once the WTS 300 is armed (either by the optional trigger switch 336 or a wake command from an external device), the WTS 300 may be automatically placed in an untampered tamper state (i.e., the WTS 300 is armed and ready to detect a physical trigger). While in this untampered tamper state, the WTS 300 may either automatically transmit a tamper state signal as a beacon or other repetitive transmission to the external device or wait for a query from the external device before answering the query (i.e., the status command) with the tamper state signal. In this example, the WTS 300 may be in a sleep state, which will not check the tamper state until receiving an authenticated request for status, at which time the processing device 306 queries directly to the sensor 314 to determine the state as tampered or untampered, after which WTS 300 immediately reports the state status to the external device.

In either case, once the physical trigger happens, the WTS 300 may continue to transmit the tamper state signal either automatically or when queried or "go silent" and not transmit any tamper state signal. In these examples, there are three situations that may affect the ability of the WTS 300 to transmit the tamper state signal. In the first and second situations, the antenna 310 is the probe 304 and it suffers damage from the physical trigger that either breaks or damages the antenna 310 but the antenna 310 is still functioning and able to transmit a signal. In these situations (as discussed earlier), the WTS 300 continues to transmit the same tamper state signal without changing the tamper state of the signal in the processor 340. As discussed earlier, in these cases the antenna 310 will alter the frequency of transmission of the tamper state signal because of the reduction of the antenna length. If the external device is configured to detect the change in transmitted frequency by the antenna 310, then there is no need to have the processor 340 change the tamper state of the WTS 300 since the tampering activity itself has caused an effective "change in state" since the resulting transmission of the tamper state signal will automatically shift in frequency based on the damage caused to the antenna 310 and the external device may be configured to detect that frequency shift and flag it as indicating that the WTS 300 has been tampered. As such, in these situations the WTS 300 does not need to do anything different once armed since the physical trigger has caused damage to the antenna 310 that causes a frequency shift that is detectable by the external device as a flag indicating that the WTS 300 has been tampered.

In the third situation, the damage to the probe 304 may be so great that the WTS 300 is not be able to transmit a tamper state signal thus indicating that the WTS 300 has been tampered. For example, if the probe 304 is the antenna 310, the damage to the antenna 310 may be so great that the antenna 310 is not function and thus not capable of transmitting the tamper state signal. Since the external device is expecting a response from the WTS 300 (in response to the status command), the external device will flag the WTS 300 as tampered because no signal was received by the external device. Alternatively, the WTS 300 may be configured to always respond to a status command queried by the external device when in the untampered tamper state but once tampered (i.e., once the physical trigger is detected), the WTS 300 may simply stop transmitting any reply to the status command. Again, in this situation, since the external device is expecting a response from the WTS 300 (in response to the status command), the external device will flag the WTS 300 as tampered.

It is appreciated that in these examples, the WTS 300 may be designed such that when the computer-executable instructions cause the processor 340 to initiate the tamper state to untampered, the computer-executable instructions are simply arming the WTS 300 for operation in detecting a physical trigger that will eventual move the optional accelerometer 315 or damage the probe 304 (which may be the antenna 310). This may include simply turning the power on for the components (i.e., the transmitter 302, receiver 312, accelerometer 315, processing device 306, sensor 314, and probe 304) of the WTS 300 so as to be able to detect the physical trigger. In this example, the WTS 300 is placed in a tampered tamper state automatically when the physical trigger happens because the physical trigger actually physically effects the WTS 300 (i.e., it moves or damages the WTS 300) in such a way that when the computer-executable instructions cause the processor 340 to set the tamper state to tampered in response to detecting the physical trigger, the computer-executable instructions are simply preparing the WTS 300 to transmit the tamper state signal either automatically or in response to receiving the status command.

Figure 4:
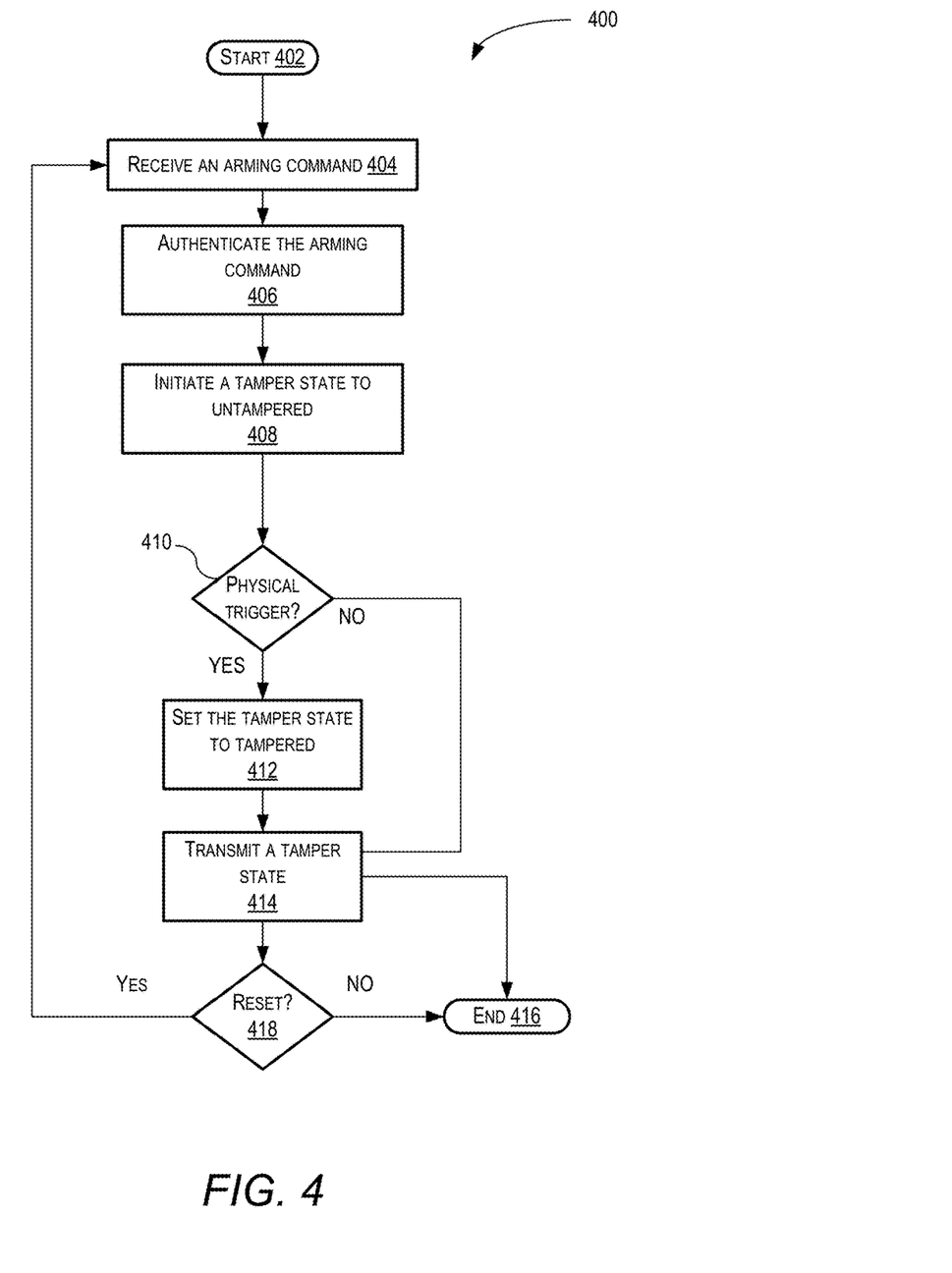
FIG. 4 is a flowchart of an example of an implementation of the method performed by the WTS, shown in FIG. 3, in accordance with the present disclosure.

Turning to FIG. 4, a flowchart is shown of an example of an implementation of the method 400 performed by the WTS 300 in accordance with the present disclosure. The method 400 starts 402 by receiving an arming command 404. As described earlier, the arming command may be a command produced by a user activating the optional trigger switch 336 or by receiving a wake command from the external device. If the arming command is the wake command from the external device, the arming command is then authenticated 406. The arming command then causes the WTS 300 to initiate the tamper state to untampered 408 as described earlier. The WTS 300 is then armed and ready to detect a physical trigger. If no physical trigger is detected, the WTS 300 remains in the armed state and ready to detect the physical trigger. The WTS 300 may then enter into a passive state that does not transmit anything until the WTS 300 receives an authenticated request for state status. Once the physical trigger is detected 410, the WTS 300 sets the tamper state to tampered 412 (as described earlier) in a fashion that may be the automatic result of the physical condition of the WTS 300 (as described earlier). The WTS 300 may then either transmit a tamper state signal 414 or wait for a status command (as described earlier) and then, in response, transmit the tamper state signal 414. In the case that the WTS 300 is an untampered state and there is no physical trigger 410, the WTS 300 may skip step 412 and optionally transmit a tamper state 414 of "untampered." Alternatively, the WTS 300 may not transmit any signal as described earlier. The method 400 may then end 416. If the WTS 300 is resettable (i.e., the WTS 300 was not damaged and reusable as described earlier), the method 400 may return to step 404, if the WTS 300 is reset, and wait for another arming command that may include a reset signal from the external device. If the WTS 300 is not reset, the method 400 then ends 416.

In this example, the WTS 300 utilizes energy to check for state of the WTS 300 and revise the state of the WTS 300 independent of the external query but in alternative example, the WTS 300 may only check for state once an authenticated status report command is received. Additionally, the WTS 300 may not transmit (i.e., send a state report) unless it receives an authenticated request to report the tamper state. Otherwise, the WTS 300 may cycle between dormant and listen-on-radio (i.e., monitor the receiver 312).

Figure 5A:
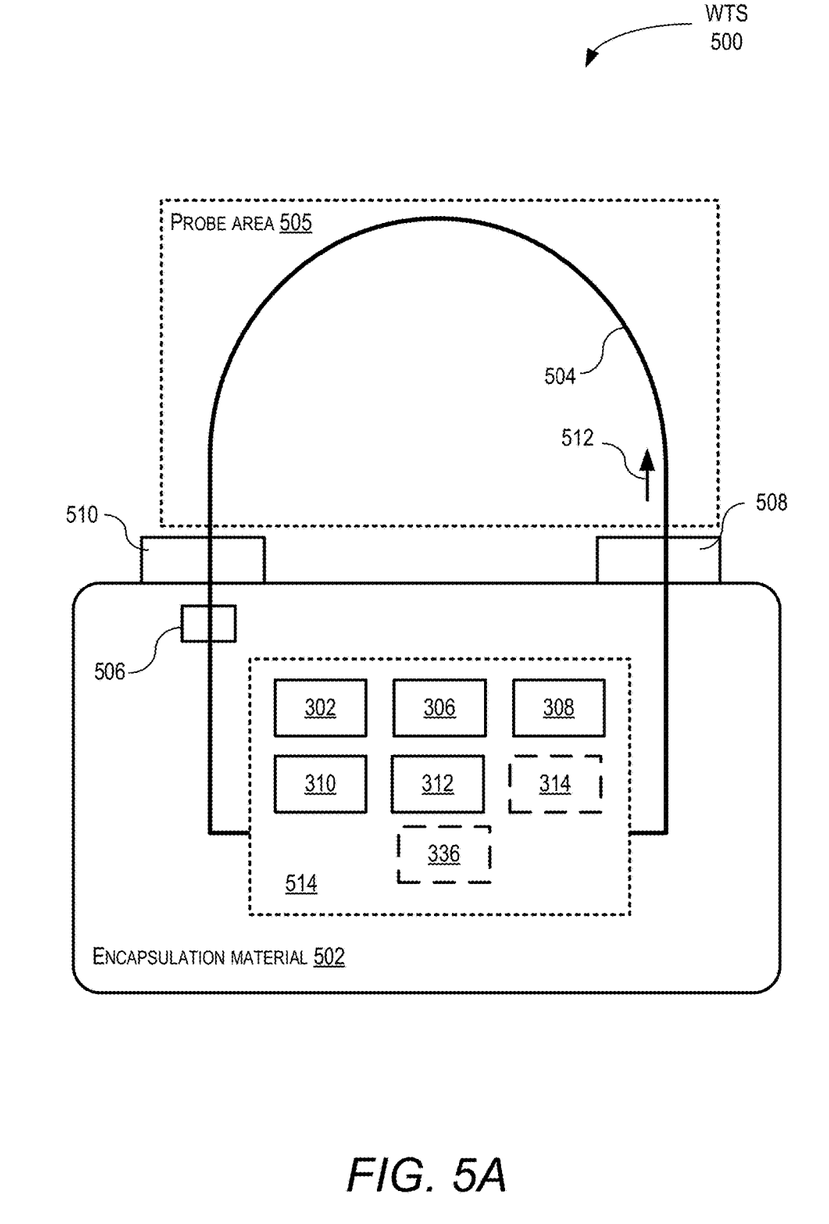
FIG. 5A is a block system diagram of an example of an implementation of the WTS, shown in FIG. 3, as a padlock type device in accordance with the present disclosure.

In FIG. 5A, a block system diagram is shown of an example of an implementation of the WTS 500 as a padlock type device in accordance with the present disclosure. In this example, the encapsulation material 502 may be in the shape of padlock including part of the probe 504 within the encapsulation material 502. The remaining portion of the probe 504 extends out of the encapsulation material 502 so as to function as a physical securing mechanism for an external object. This remaining portion of the probe 504 is shown as a probe area 505 that extends out of the encapsulation material 502. As an example, the probe 504 may be a wire that is of sufficient thickness to secure the external object (i.e., monitor it for a tampering activity) but not necessary thick enough to act as a locking device similar to a normal padlock. In this example, the encapsulation material 502 may include a locking mechanism 506 that locks the probe 504 into place similar to known padlock locking mechanisms. Additionally, in this example, the probe 504 is shown to extend outward from a first end 508 of the encapsulation material 502 to a second end 510 of the encapsulation material 502. As an example, the probe 504 may be a continuous wire that forms a closed circuit within the WTS 500 such that a current 512 flows from and to the WTS 500 when the probe 504 is undamaged. In this example, the encapsulation material 502 includes an electronic portion 514 of the WTS 500 that includes the transmitter 302, receiver 312, antenna 310, processing device 306, power supply, and part of the probe 504. The encapsulation material 502 may also include the optional sensor 314 and optional trigger switch 336. In this example, the electronic portion 514 include the power supply 308 and a system on a chip ("SOC"), ASIC, FPGA, or a substrate or printed circuit board ("PCB") having the transmitter 302, receiver 312, antenna 310, and processing device 306. In this example, the WTS 500 detects tampering (i.e., a physical trigger) via a break in the probe 504.

Figure 5B:
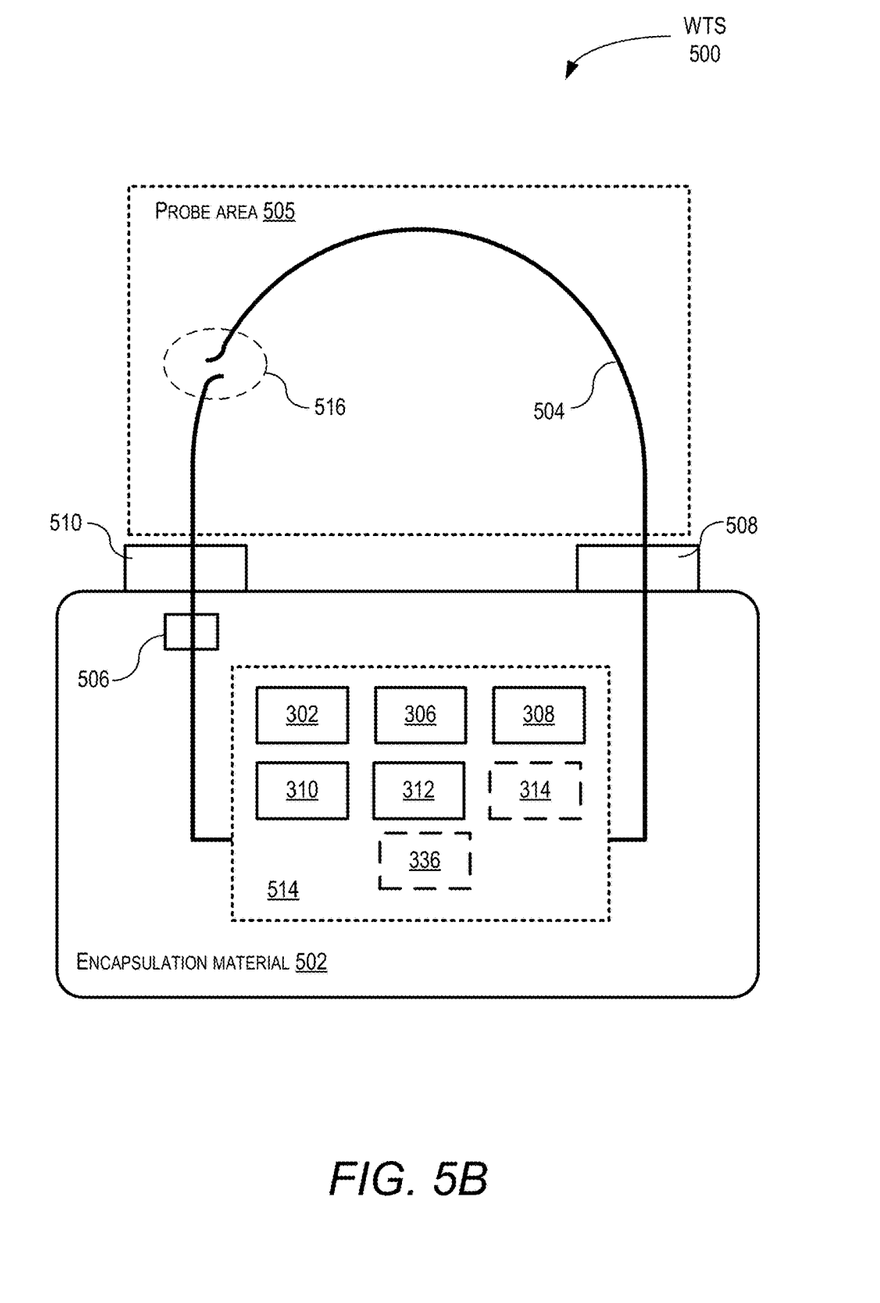
FIG. 5B is a block system diagram of the WTS, shown in FIG. 5A, after being tampered in accordance with the present disclosure.

In an example of operation, prior to any tampering activity, the probe 504 is continuous and undamaged. The WTS 500 receives a wake command from an external device that is authenticated as an authenticated interrogator by the WTS 500 performing a series of predetermined security protocols. As described earlier, in another example, the wake command may not cause the WTS 500 to set the tampered state to untampered. Once authenticated, the WTS 500 transmits a tamper state back to the interrogator (i.e., the external device). More specifically, the WTS 500 may first authenticate, then check the current state of the tamper, write and/or compile a report, and transmit the tamper state to the interrogator. As described earlier, if a tamper has occurred (i.e., the WTS 500 has experienced a physical trigger), the WTS 500 may either send back a tamper state signal indicating that the tamper state of the WTS 500 is "tampered," or the WTS 500 will not send back the tamper state signal at all. It is appreciated from the previous description that in this example, the probe 504 and antenna 310 may be the same element and as such when the probe 504 is broken the antenna 310 will be broken and have a shorted antenna length causing the WTS 500 to send back an altered (i.e., frequency shifted) tamper state signal. In the case of no tamper state signal being sent back, as described earlier, the damage to the probe 504 may be such that the WTS 500 is incapable of transmitting the tamper state signal. For example, the probe 504 and antenna 310 are the same element that is too damaged to transmit the tamper state signal or the probe 504 is separate from the antenna 310 but once the probe 504 is broken the current 512 flow within the WTS 500 is interrupted and the interruption disables the operation of the WTS 500. As another example, the WTS 500 is simply designed to transmit the tamper state signal to the external device only when the WTS 500 is untampered but once tampered, the WTS 500 stops transmitting the tamper state signal. In all of these examples, the WTS 500 provides both a wireless and visual indication of tamper evidence. In FIG. 5B, a block system diagram is shown of the WTS 500 after being tampered in accordance with the present disclosure. The physical trigger 516 is shown as a fissure along the probe 504.

Figure 6A:
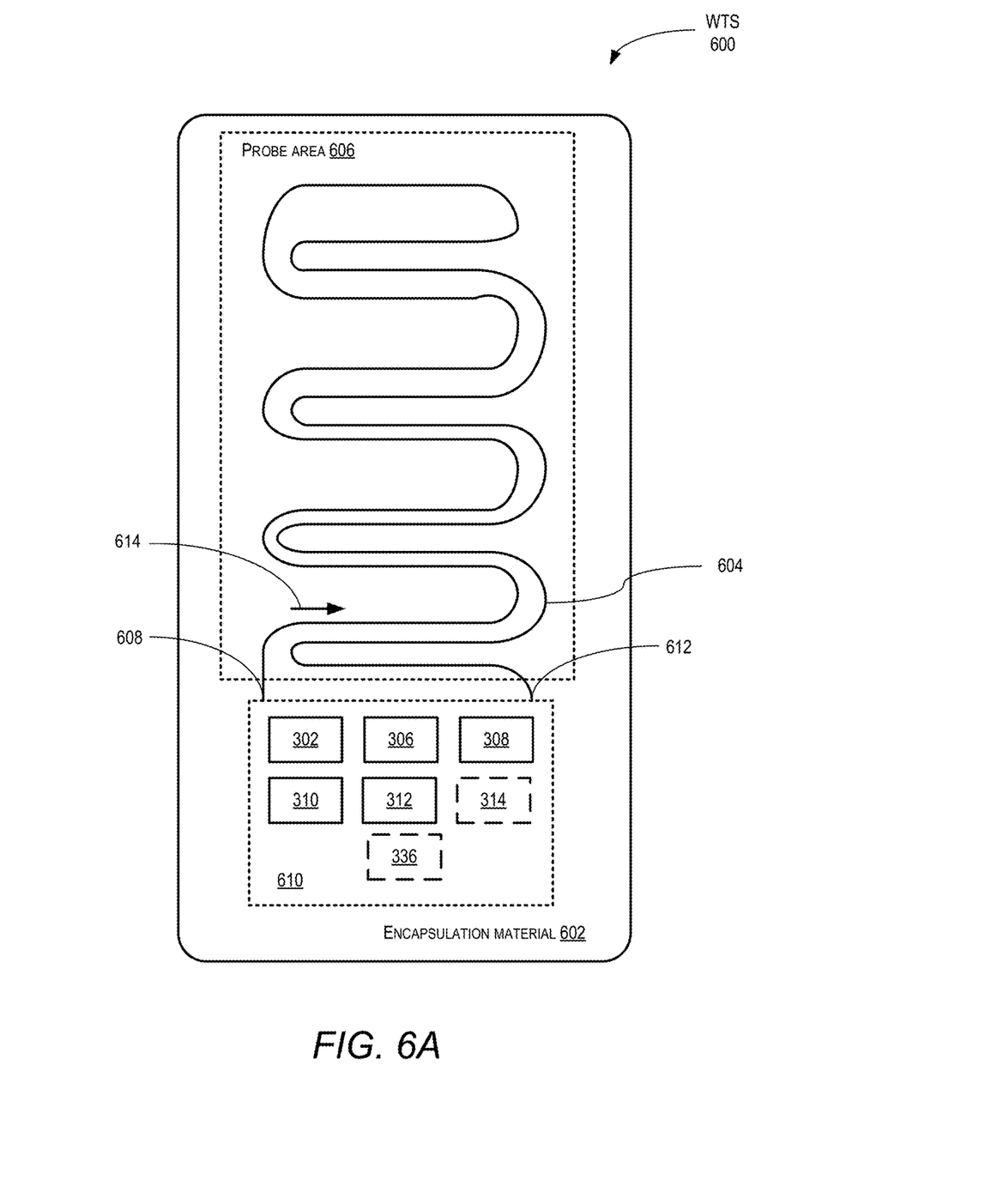
FIG. 6A is a block system diagram of an example of an implementation of the WTS, shown in FIG. 3, as a flat "Band-Aid" type of device in accordance with the present disclosure.

In FIG. 6A, a block system diagram is shown of an example of an implementation of the WTS 600 as a flat rectangular "Band-Aid" type of device in accordance with the present disclosure. In this example, the encapsulation material 602 may be in the shape of a large rectangular flat "Band-Aid." In this example, the probe 604 extends throughout the encapsulation material 602 in a turning fashion that fills a probe area 606 along a first portion of the encapsulated material 602. As an example, the probe 604 may be wire (or other electrically conductive material with the proper performance properties of current, resistance, capacitance, voltage, etc.) that is of sufficient thickness to detect any tampering along the probe area 606. As before, in this example, the probe 604 is shown to extend outward from a first end 608 of an electronic portion 610 to a second end 612 of the electronic portion 610. As an example, the probe 604 may be a continuous wire that forms a closed circuit within the WTS 600 such that a current 614 flows from and to the electronic portion 610 when the probe 604 is undamaged. Similar to the last example, in this example, the electronic portion 610 is part of the encapsulation material 602 and includes the transmitter 302, receiver 312, antenna 310, processing device 306, power supply, and part of the probe 604. The electronic portion 610 may also include the optional sensor 314 and optional trigger switch 336. In this example, the electronic portion 610 includes the power supply 308 and a SOC, ASIC, FPGA, or a substrate or PCB having the transmitter 302, receiver 312, antenna 310, and processing device 306. In this example, the WTS 600 detects tampering (i.e., a physical trigger) via a break in the probe 604 along the probe area 606.

Prior to any tampering activity, the probe 604 is continuous and undamaged. The WTS 600 is attached to a surface (or across multiple surfaces) and detects when there has been physical separation from the attaching surface or surfaces that causes damage to the probe 604. In this example, the Although the WTS 600 can attach to a flat surface, it is appreciated that in this example the electronic portion 610 is at one end of the WTS 600 such that the WTS 600 can be utilized for a corner application.

Figure 6B:
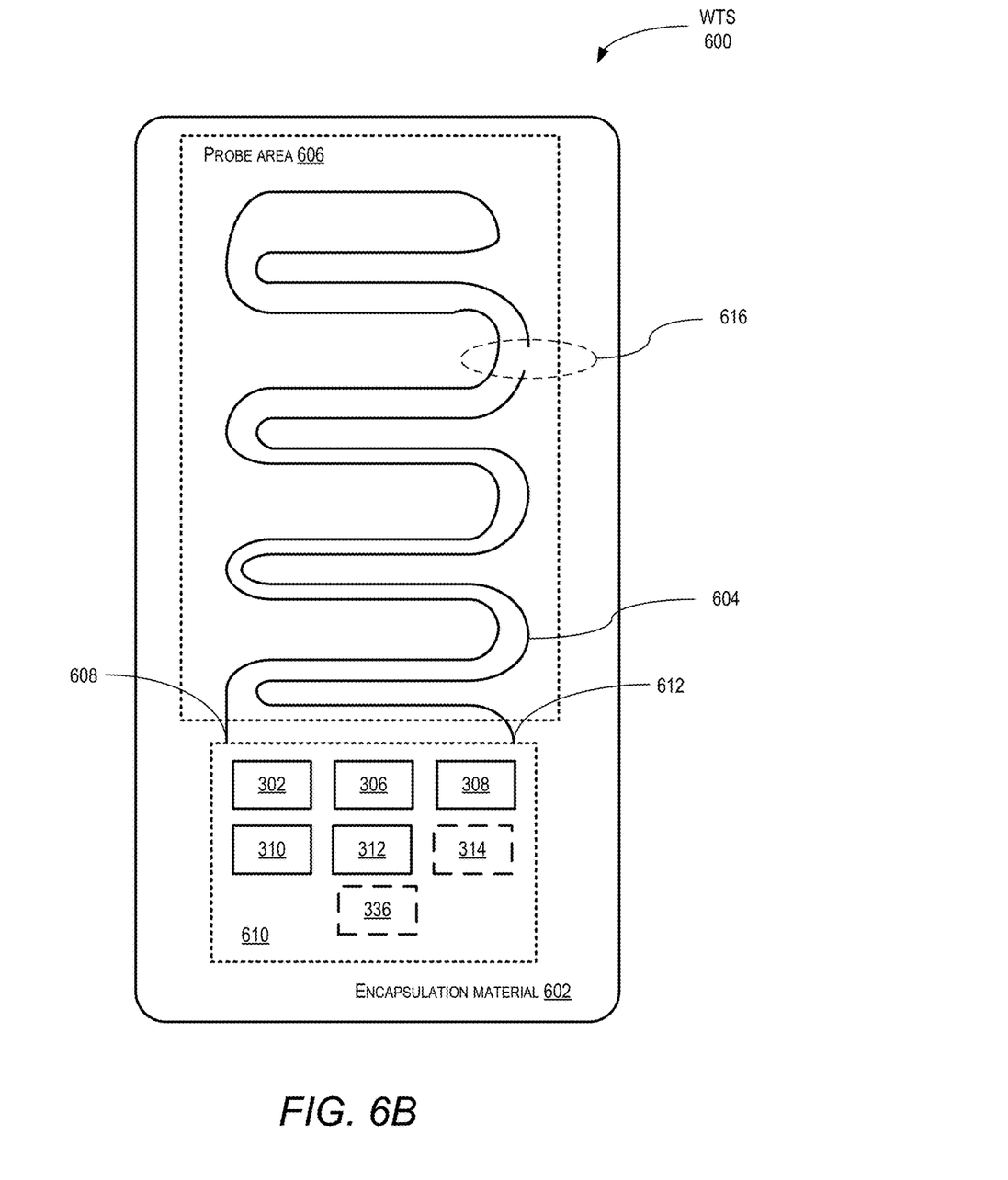
FIG. 6B is a block system diagram of the WTS, shown in FIG. 6A, after being tampered in accordance with the present disclosure.

Similar to the previous example, in an example of operation, the WTS 600 receives wake command from an external device that is authenticated as an authenticated interrogator by the WTS 600 performing a series of predetermined security protocols. As described earlier, in another example, the wake command may not cause the WTS 600 to set the tampered state to untampered. Once authenticated, the WTS 600 transmits a tamper state back to the interrogator (i.e., the external device). More specifically, the WTS 600 may first authenticate, then check the current state of the tamper, write and/or compile a report, and transmit the tamper state to the interrogator. As described earlier, if a tamper has occurred (i.e., the WTS 600 has experienced a physical trigger), the WTS 600 may either send back a tamper state signal indicating that the tamper state of the WTS 600 is "tampered," or the WTS 600 will not send back the tamper state signal at all. It is appreciated from the previous description that in this example, the probe 604 and antenna 310 may be the same element and as such when the probe 604 is broken the antenna 310 will be broken and have a shorted antenna length causing the WTS 600 to send back and altered (i.e., frequency shifted) tamper state signal. In the case of no tamper state signal being sent back, as described earlier, the damage to the probe 604 may be such that the WTS 600 is incapable of transmitting the tamper state signal. For example, the probe 604 and antenna 310 are the same an too damaged to transmit the tamper state signal or the probe 604 is separate from the antenna 310 but once the probe 604 is broken the current 614 flow within the WTS 600 is interrupted and the disables the operation of the WTS 600. As another example, the WTS 600 is simply designed to transmit the tamper state signal to the external device only when the WTS 600 is untampered but once tampered, the WTS 600 stops transmitting the tamper state signal. In all of these examples, the WTS 600 provides both a wireless and visual indication of tamper evidence. In FIG. 6B, a block system diagram is shown of the WTS 600 after being tampered in accordance with the present disclosure. The physical trigger 616 is shown as a fissure along the probe 604.

Figure 7A:
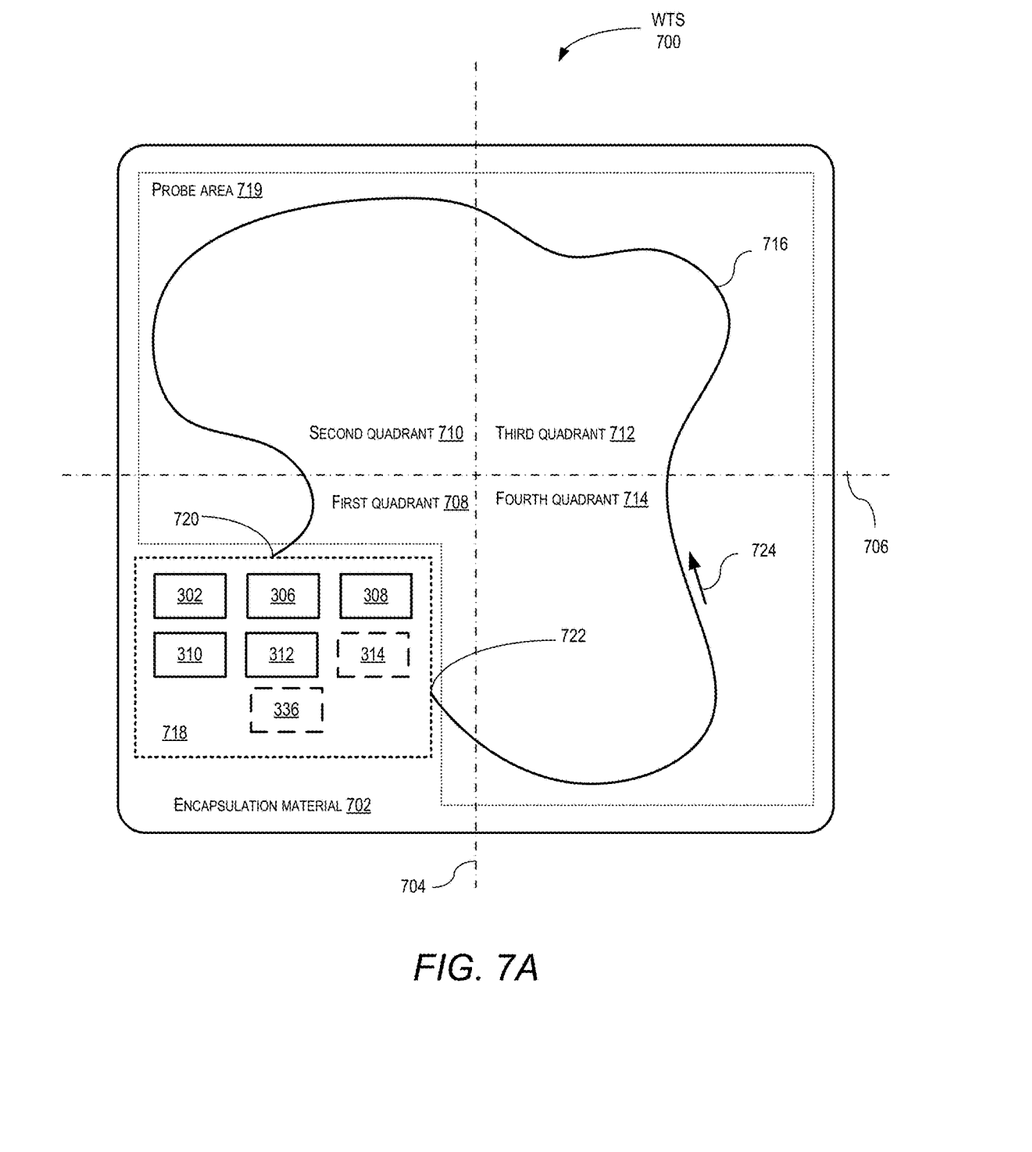
FIG. 7A is a block system diagram of an example of an implementation of the WTS, shown in FIG. 3, as a hybrid type of device in accordance with the present disclosure.

In FIG. 7A, a block system diagram is shown of an example of an implementation of the WTS 700 as a hybrid type of device in accordance with the present disclosure. In this example, the encapsulation material 702 may be in the shape of a flat sheet that has a first axis 704 and a second axis 706 that divide up the flat sheet into a first quadrant 708, second quadrant 710, third quadrant 712, and fourth quadrant 714. The power supply 308 and other electronics reside in one quadrant (i.e., the first quadrant 708) of the WTS 700 to provide corner or cross surface applications for the WTS 700. In this example, the encapsulation material 702 includes a probe 716 that is in portions of all four quadrants 708, 710, 712, and 714 and an electronics portion 718 of the WTS 700 that includes the transmitter 302, receiver 312, antenna 310, processing device 306, power supply 308, and part of the probe 716. This portions of all four quadrants 708, 710, 712, and 714 that include the probe 716 is shown as a probe area 719 that extends out of the electronics portion 718. The electronics portion 718 may also include the optional sensor 314 and optional trigger switch 336. In this example, the electronics portion 718 includes the power supply 308 and a SOC, ASIC, FPGA, or a substrate or PCB having the transmitter 302, receiver 312, antenna 310, and processing device 306. As an example, the probe 716 may be wire (or other electrically conductive material with the proper performance properties of current, resistance, capacitance, voltage, etc.) that is of sufficient thickness to detect any tampering along a probe area that is part of all four quadrants 708, 710, 712, and 714. As before, in this example, the probe 716 is shown to extend outward from a first end 720 of the electronics portion 718 to a second end 722 of the electronics portion 718. As an example, the probe 716 may be a continuous wire that forms a closed circuit within the WTS 700 such that a current 724 flows from and to the WTS 700 when the probe 716 is undamaged. As described earlier, the probe 712 and antenna 310 may be the same element. In this example, the WTS 700 detects tampering (i.e., a physical trigger) via a break 726 in the probe 716 along the probe area which is a break or rip 728 in the encapsulation material 702 and break 726 in the probe 716 along one of the axis 704 and 706.

Figure 7B:
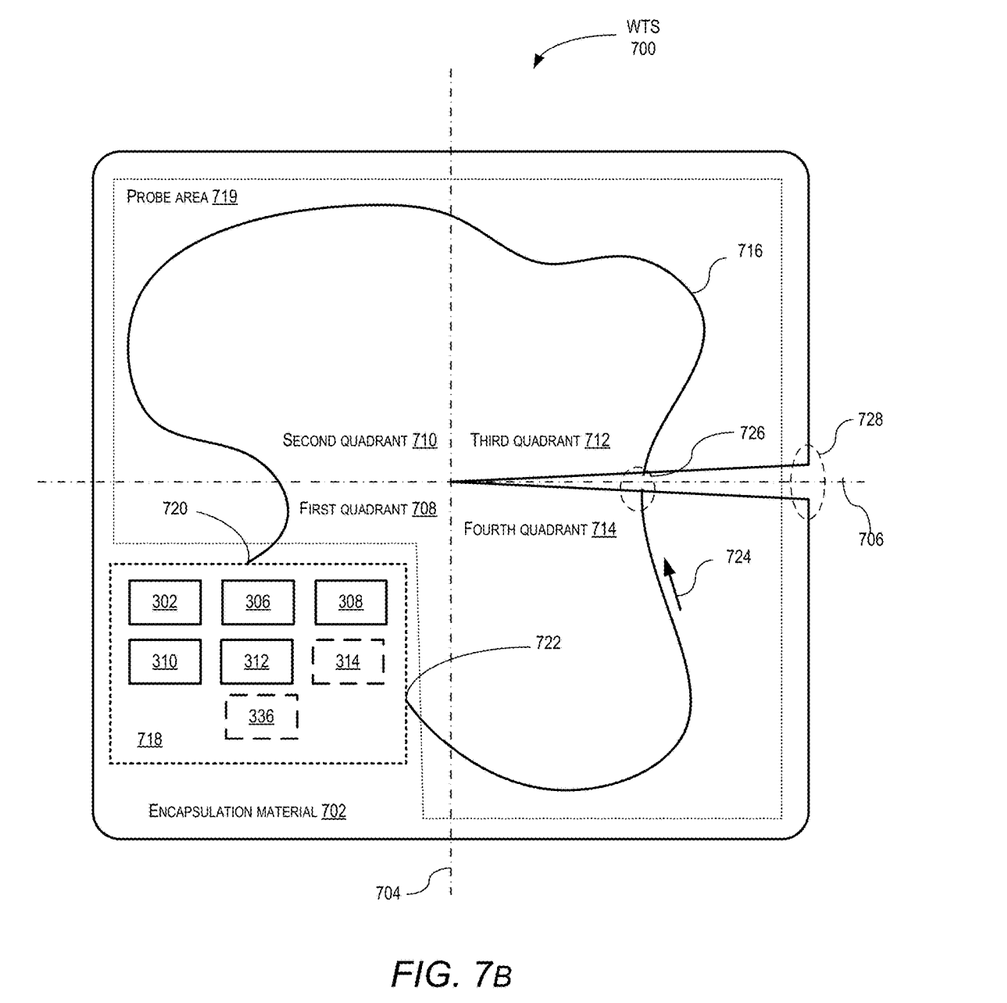
FIG. 7B is a block system diagram of the WTS, shown in FIG. 7A, after being tampered in accordance with the present disclosure.

Similar to the previous examples, in an example of operation, the WTS 700 receives wake command from an external device that is authenticated as an authenticated interrogator by the WTS 700 performing a series of predetermined security protocols. As described earlier, in another example, the wake command may not cause the WTS 700 to set the tampered state to untampered. Once authenticated, the WTS 700 transmits a tamper state back to the interrogator (i.e., the external device). More specifically, the WTS 700 may first authenticate, then check the current state of the tamper, write and/or compile a report, and transmit the tamper state to the interrogator. As described earlier, if a tamper has occurred (i.e., the WTS 700 has experienced a physical trigger), the WTS 700 may either send back a tamper state signal indicating that the tamper state of the WTS 700 is "tampered," or the WTS 700 will not send back the tamper state signal at all. It is appreciated from the previous description that in this example, the probe 716 and antenna 310 may be the same element and as such when the probe 716 is broken the antenna 310 will be broken and have a shorted antenna length causing the WTS 700 to send back an altered (i.e., frequency shifted) tamper state signal. In the case of no tamper state signal being sent back, as described earlier, the damage to the probe 716 may be such that the WTS 700 is incapable of transmitting the tamper state signal. For example, the probe 716 and antenna 310 are the same an too damaged to transmit the tamper state signal or the probe 716 is separate from the antenna 310 but once the probe 716 is broken the current 724 flow within the WTS 700 is interrupted and the disables the operation of the WTS 700. As another example, the WTS 700 is simply designed to transmit the tamper state signal to the external device only when the WTS 700 is untampered but once tampered, the WTS 700 stops transmitting the tamper state signal. In all of these examples, the WTS 700 provides both a wireless and visual indication of tamper evidence. In FIG. 7B, a block system diagram is shown of the WTS 700 after being tampered in accordance with the present disclosure. The physical trigger 726 is shown as a fissure along the probe 716 along a rip 728 in the encapsulation material 702.

Figure 8:
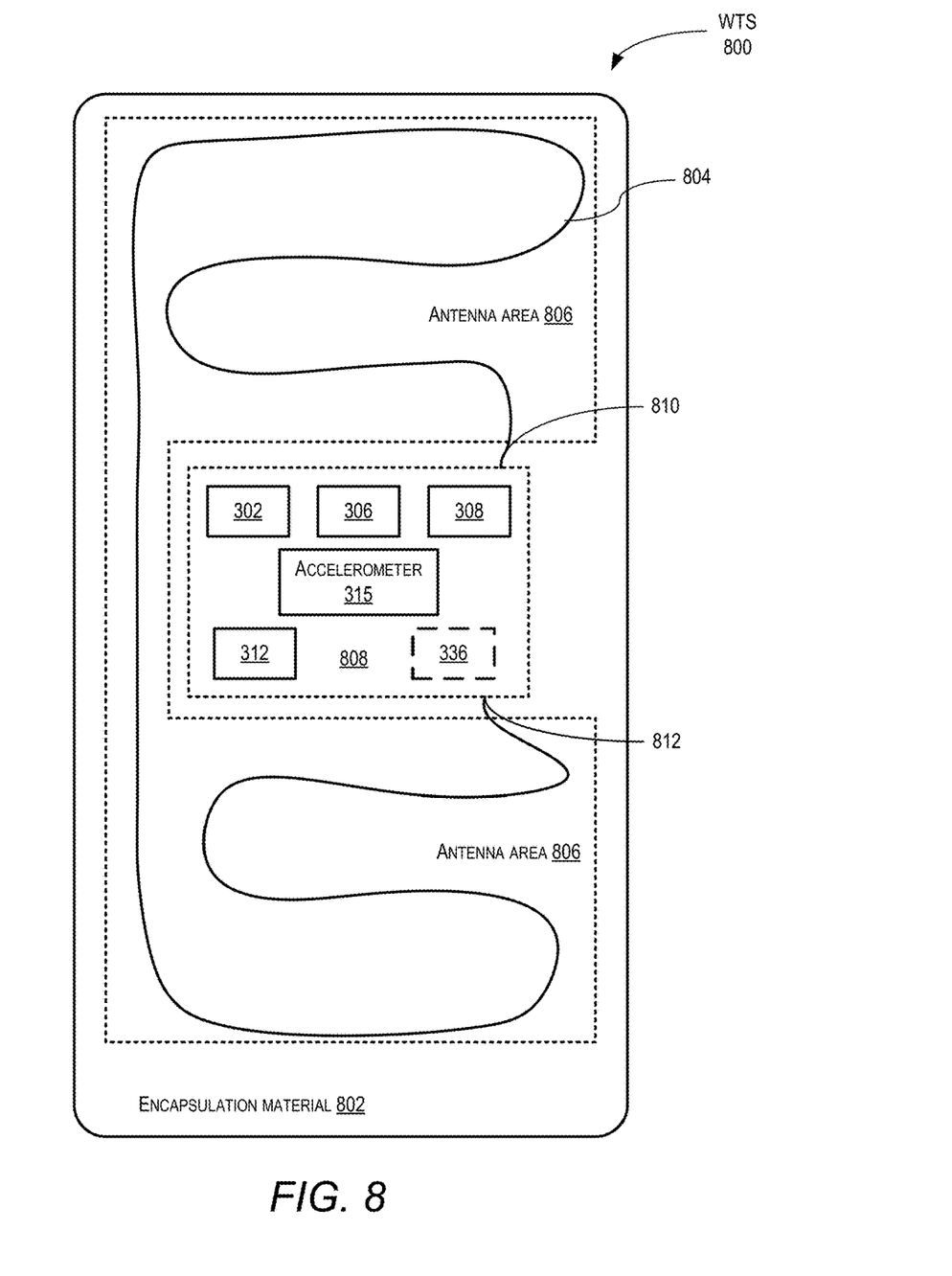
FIG. 8 is a block system diagram of an example of an implementation of the WTS, shown in FIG. 3, that is resettable in accordance with the present disclosure.

In FIG. 8, a block system diagram is shown of an example of an implementation of the WTS 800 that is resettable in accordance with the present disclosure. In this example, the encapsulation material 802 may be in the shape of a flat rectangular sheet that includes part of the antenna 804 within an antenna area 806 of the encapsulation material 802. The antenna 804 extends through the antenna area 806 in a manner that fills the antenna area 806. Within the encapsulation material 802 is also an electronics portion 808 that includes the power supply 308 and a SOC, ASIC, FPGA, or a substrate or PCB having the transmitter 302, receiver 312, accelerometer 315, and the processing device 306. The electronics portion 808 may also include the optional trigger switch 336. In this example, the antenna 804 is shown extending outward from a first end 810 of the electronics portion 808 to an optional second end 812 of the electronics portion 808. As an example, the antenna 804 may be a wire, foil, or electro-deposited metal.

In this example, the WTS 800 detects tampering (i.e., a physical trigger) via the accelerometer 315. Specifically, the accelerometer 315 is designed to detect a physical trigger based on movements or vibrations on the WTS 800. Because the internal and external components of the WTS 800 are not altered after a physical trigger (i.e., the WTS 800 is not broken or damaged), the WTS 800 is resettable and can detect multiple physical triggers (i.e., tamper events) throughout its design life.

Similar to the previous examples, in an example of operation, the WTS 800 receives wake command from an external device that is authenticated as an authenticated interrogator by the WTS 800 performing a series of predetermined security protocols. As described earlier, in another example, the wake command may not cause the WTS 800 to set the tampered state to untampered. Once authenticated, the WTS 800 transmits a tamper state back to the interrogator (i.e., the external device). More specifically, the WTS 800 may first authenticate, then check the current state of the tamper, write and/or compile a report, and transmit the tamper state to the interrogator. As described earlier, if a tamper has occurred (i.e., the WTS 800 has experienced a physical trigger), the WTS 800 may either send back a tamper state signal indicating that the tamper state of the WTS 800 is "tampered," or the WTS 800 will not send back the tamper state signal at all. In the case of not sending back the tamper state signal, the WTS 800 may simply be designed to transmit the tamper state signal to the external device only when the WTS 800 is untampered but once tampered, the WTS 800 stops transmitting the tamper state signal. Since the WTS 800 is not damaged by detecting the physical trigger, after the physical trigger has been detected, the WTS 800 may be reset to an untampered state for reuse in detecting another physical trigger. The WTS 800 may be reset by receiving a reset signal from the external device after the WTS 800 was placed in a tampered state; the WTS 800 may then be reutilized. Alternatively, the WTS 800 may also be reset by a user again activating the optional trigger switch 336.

It will be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

The flowchart and block diagrams in the different depicted example of implementations illustrate the architecture, functionality, and operation of some possible implementations of apparatuses and methods in an illustrative example. In this regard, each block in the flowchart or block diagrams may represent a module, a segment, a function, a portion of an operation or step, some combination thereof.

In some alternative examples of implementations, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different examples of implementations has been presented for purposes of illustration and description, and is not intended to be exhaustive or limited to the examples in the form disclosed. Many modifications and variations will be apparent to those of ordinary skill in the art. Further, different examples of implementations may provide different features as compared to other desirable examples. The example, or examples, selected are chosen and described in order to best explain the principles of the examples, the practical application, and to enable others of ordinary skill in the art to understand the disclosure for various examples with various modifications as are suited to the particular use contemplated.

What is claimed is:

1. A wireless tamper sensor ("WTS"), the WTS comprising:
   a transmitter;
   a receiver;
   a probe;
   a processing device in signal communication with the probe; and
   a power supply in signal communication with the transmitter and the processing device,
   wherein the processing device includes
      a processor, and
      a computer-readable medium ("CRM") having encoded thereon computer-executable instructions to cause the processor to
         initiate a tamper state of the WTS to untampered when the WTS is armed by a user,
         detect a physical trigger on the probe,
         set the tamper state to tampered in response to detecting the physical trigger,
         receive a wake command from an external device, wherein the user utilizes the external device to arm the WTS with the wake command, and
         authenticate the wake command,
      wherein initiating the tamper state includes initiating the tamper state to untampered once the received wake command is authenticated.

2. The WTS of claim 1, further including an encapsulating material that encloses the WTS.

3. The WTS of claim 1, further including
   a trigger switch, wherein the trigger switch is armed by the user,
   wherein the initiating the tamper state includes initiating the tamper state to untampered once the trigger switch is activated.

4. The WTS of claim 1,
   wherein the probe is an antenna having an approximate fractional length of antenna length, and
   wherein the physical trigger is a breaking of the probe that reduces the antenna length.

5. The WTS of claim 1, wherein detecting the physical trigger on the probe includes determining that the probe is broken.

6. The WTS of claim 1, further including a sensor in signal communication with the processing device, wherein the sensor senses the physical trigger on the probe.

7. The WTS of claim 1, wherein the computer-executable instructions further cause the processor to
   transmit a tamper state signal in response to detecting the physical trigger,
   wherein the tamper state signal indicates that the tamper state is either tampered or untampered.

8. The WTS of claim 7, wherein the computer-executable instructions further cause the processor to
   receive a status command from the external device,
   authenticate the status command, and
   transmit the tamper state signal in response to receiving the status command,
   wherein the tamper state signal indicates that the tamper state is either tampered or untampered.

9. The WTS of claim 1, further including
   an accelerometer,
   wherein detecting the physical trigger includes detecting the physical trigger as either a movement or vibration with the accelerometer.

10. The WTS of claim 9, wherein the computer-executable instructions further cause the processor to
    receive a reset signal from an external device, and
    reset the tamper state to untampered in response to receiving the reset signal.

11. The WTS of claim 1,
    wherein the processing device is a field programmable-gate array ("FPGA"), and
    wherein the CRM is firmware.

12. A method for detecting tampering on a wireless tamper sensor ("WTS"), the method comprising:
    arming the WTS by a user, wherein arming includes initiating a tamper state of the WTS to untampered;
    detecting a physical trigger;
    setting the tamper state to tampered in response to detecting the physical trigger,
    receiving a wake command from an external device, wherein the user utilizes the external device to arm the WTS with the wake command, and
    authenticating the wake command,
    wherein the initiating the tamper state includes initiating the tamper state to untampered once the received wake command is authenticated.

13. The method of claim 12, further including transmitting a tamper state signal in response to detecting the physical trigger, wherein the tamper state signal indicates that the tamper state is tampered.

14. The method of claim 12, further including receiving a status command from the external device, authenticate the status command, and transmitting a tamper state signal in response to receiving the status command, wherein the tamper state signal indicates that the tamper state is tampered.

15. The method of claim 14, wherein detecting the physical trigger includes determining that a probe has been either broken or substantially altered.

16. The method of claim 15, wherein determining that a probe has been either broken or substantially altered includes determining visually that the probe has been either broken or substantially altered.

17. The method of claim 15, wherein the probe is an antenna.

18. The method of claim 14, wherein detecting the physical trigger includes detecting the physical trigger as either a movement or vibration with an accelerometer.

19. The method of claim 18, further including
    receiving a reset signal from the external device, and
    resetting the tamper state to untampered.

* * * * *

UNITED STATES PATENT AND TRADEMARK OFFICE
CERTIFICATE OF CORRECTION

PATENT NO. : 10,152,855 B1
APPLICATION NO. : 15/611719
DATED : December 11, 2018
INVENTOR(S) : Hollice C. Smith et al.

Page 1 of 1

It is certified that error appears in the above-identified patent and that said Letters Patent is hereby corrected as shown below:

On the Title Page

Column 1, Line 10:
"Minas H. Tanelian"
Should read:
--Minas H. Tanielian--.

Signed and Sealed this
Twelfth Day of February, 2019

Andrei Iancu
*Director of the United States Patent and Trademark Office*